(12) United States Patent
Wang et al.

(10) Patent No.: US 12,244,445 B2
(45) Date of Patent: Mar. 4, 2025

(54) DATA PROCESSING METHOD AND APPARATUS, AND DEVICE AND STORAGE MEDIUM

(71) Applicant: SANECHIPS TECHNOLOGY CO., LTD., Shenzhen (CN)

(72) Inventors: Qiaoyu Wang, Shenzhen (CN); Xing Liu, Shenzhen (CN); Dingming Zhang, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 239 days.

(21) Appl. No.: 18/000,738

(22) PCT Filed: Jul. 14, 2021

(86) PCT No.: PCT/CN2021/106274
§ 371 (c)(1),
(2) Date: Dec. 5, 2022

(87) PCT Pub. No.: WO2022/017236
PCT Pub. Date: Jan. 27, 2022

(65) Prior Publication Data
US 2023/0336393 A1    Oct. 19, 2023

(30) Foreign Application Priority Data

Jul. 24, 2020  (CN) .......................... 202010725688.5

(51) Int. Cl.
H04L 27/26    (2006.01)
(52) U.S. Cl.
CPC ...... *H04L 27/2628* (2013.01); *H04L 27/2607* (2013.01); *H04L 27/265* (2013.01)

(58) Field of Classification Search
CPC ............. H04L 27/2602; H04L 27/2607; H04L 27/2626; H04L 27/2628; H04L 27/2647; H04L 27/265
See application file for complete search history.

(56) References Cited

U.S. PATENT DOCUMENTS 7,082,451 B2   7/2006  Kulkarni et al.
8,095,173 B2   1/2012  Chapyzhenka et al.
(Continued)

FOREIGN PATENT DOCUMENTS

CN    1556642 A     12/2004
CN    103546394 A    1/2014
(Continued)

OTHER PUBLICATIONS

International Searching Authority. International Search Report and Written Opinion for PCT Application No. PCT/CN2021/106274 and English translation, mailed Oct. 12, 2021, pp. 1-9.
(Continued)

*Primary Examiner* — Melvin C Marcelo
*Assistant Examiner* — Natali Pascual Peguero
(74) *Attorney, Agent, or Firm* — Vivacqua Crane, PLLC (57) ABSTRACT

Provided are a data processing method and apparatus, a device and a non-transitory computer-readable storage medium. The data processing method may include determining an operating mode and buffer description BD parameters that correspond to data to be processed, and processing the data to be processed with the BD parameters according to the determined operating mode.

19 Claims, 7 Drawing Sheets

Determine an operating mode and BD parameters that correspond to data to be processed — S11

Process the data to be processed with the BD parameters according to the determined operating mode — S12

(56) References Cited

U.S. PATENT DOCUMENTS

| | | | |
|---|---|---|---|
| 2006/0104295 A1 | 5/2006 | Worley et al. | |
| 2007/0233994 A1 | 10/2007 | Ye | |
| 2008/0080598 A1* | 4/2008 | Mo | H04L 27/2601 375/219 |
| 2008/0186887 A1* | 8/2008 | Chapyzhenka | H04W 8/245 370/310 |
| 2016/0266925 A1 | 9/2016 | Wei | |

FOREIGN PATENT DOCUMENTS

| | | |
|---|---|---|
| CN | 105988953 A | 10/2016 |
| EP | 2903169 B1 | 11/2017 |

OTHER PUBLICATIONS

The State Intellectual Property Office of People's Republic of China. English translation of Search Report for CN Application No. 202010725688.5, mailed Feb. 23, 2024, pp. 1-2.

The State Intellectual Property Office of People's Republic of China. First Office Action for CN Application No. 202010725688.5 and English translation, mailed Feb. 24, 2024, pp. 1-11.

European Patent Office. Extended European Search Report for EP Application No. 21846985.6, mailed Jan. 17, 2024, pp. 1-9.

Mitola, J. "The Software Radio Architechture," IEEE Communications, vol. 33, No. 5, May 1995, pp. 26-38.

* cited by examiner

DATA PROCESSING METHOD AND APPARATUS, AND DEVICE AND STORAGE MEDIUM

CROSS-REFERENCE TO RELATED APPLICATION

This application is a national stage filing under 35 U.S.C. § 371 of international application number PCT/CN2021/106274, filed Jul. 14, 2021, which claims priority to Chinese patent application No. 202010725688.5, filed Jul. 24, 2020. The contents of these applications are incorporated herein by reference in their entirety.

TECHNICAL FIELD

The disclosure relates to the technical field of communication, and in particular to a data processing method and apparatus, a device and a non-transitory computer-readable storage medium.

BACKGROUND

Orthogonal frequency division multiplexing (OFDM) technology is widely used in modern communication systems. With the rapid development of 4G/5G mobile communication and wireless technology, the requirements for the transmission rate, capacity and transmission quality of wireless systems are constantly increasing, and it is necessary to provide richer usage scenarios. Meanwhile, the reduction of system deployment cost and system power consumption, and the flexibility in use have become a huge challenge.

In an environment with limited bandwidth resources, how to adapt to different application scenarios and realize and integrate independent functional requirements will be a complex and systematic project. Also, with the diversity of business scenarios and the complexity of implementing the requirements, how to provide more functions under the condition of increased resource constraints, and at the same time reduce bandwidth and power consumption, is an urgent problem to be solved immediately.

SUMMARY

Embodiments of the disclosure provide a data processing method and apparatus, a device, and a non-transitory computer-readable storage medium.

According to an embodiment of the disclosure, provided is a data processing method. The method includes: determining an operating mode and BD parameters that correspond to data to be processed; and processing the data to be processed with the BD parameters according to the determined operating mode.

According to another embodiment of the disclosure, provided is a data processing apparatus. The apparatus includes: a determination module configured to determine an operating mode and BD parameters that correspond to data to be processed; and a processing module configured to process the data to be processed with the BD parameters according to the determined operating mode.

According to yet another embodiment of the disclosure, provided is a device. The device includes: one or more processors; and a memory configured to store one or more programs, which, when executed by the one or more processors, cause the one or more processors to carry out any one of the methods as provided in the embodiments of the disclosure.

According to yet another embodiment of the disclosure, provided is a non-transitory computer-readable storage medium storing computer programs which, when executed by a processor, cause the processor to carry out any one of the methods as provided in the embodiments of the disclosure.

As for the above-mentioned embodiments and other aspects of the disclosure, as well as implementations thereof, further explanation is provided in the Brief Description of Drawings, the Detailed Description and the Claims.

DETAILED DESCRIPTION

In order to make the purpose, technical scheme and advantages of the disclosure clearer, the embodiments of the disclosure will be described in detail below in conjunction with the accompanying drawings. It should be noted that, in the case of no conflict, the embodiments and the features thereof in the disclosure may be arbitrarily combined with each other.

Steps shown in the flowcharts of the drawings may be performed in a computer system, for example, performed by a set of computer-executable instructions. Also, although a logical order is shown in a flowchart, in some cases, the steps shown or described may be performed in an order different from that here.

The technical scheme of the disclosure may be applied to various communication systems, such as: a global system of mobile communication (GSM), a code division multiple access (CDMA) system, a wideband code division multiple access (WCDMA) system, a general packet radio service (GPRS) system, a long term evolution (LTE) system, an advanced long term evolution (LIE-A) system, an universal mobile telecommunication system (UMTS), a 5th generation wireless system (5G) system, etc., which are not limited in the embodiments of the disclosure. In the disclosure, a 5G system is taken as an example for illustration.

According to an embodiment of the disclosure, a base station may be a device capable of communicating with a user terminal. The base station may be any kind of device with a radio transceiving function. The base station includes, but is not limited to: a base station NodeB, an evolved base station eNodeB, a base station in a 5G communication system, a base station in a future communication system, an access node in a WiFi system, a radio relay node, a radio backhaul node, etc. The base station may also be a wireless controller in a cloud radio access network (CRAN) scenario. The base station may further be a small cell, a transmission reference point (TRP), etc., which is not limited in the embodiments of the disclosure. In the disclosure, a 5G base station is taken as an example for illustration.

According to an embodiment of the disclosure, the user terminal is a device with a radio transceiving function, which may be deployed on land, including indoor or outdoor, being handheld, wearable, or vehicle-mounted; may also be deployed on water (e.g. on a ship, etc.); and may further be deployed in air (e.g. on an airplane, a balloon, and a satellite). The user terminal may be a mobile phone, a pad, a computer with a radio transceiving function, a virtual reality (VR) terminal, an augmented reality (AR) terminal, a wireless terminal in industrial control, a wireless terminal in self-driving, a wireless terminal in remote medical, a wireless terminal in smart grid, a wireless terminal in transportation safety, a wireless terminal in smart city, a wireless terminal in smart home, and so on. The application scenarios are not limited in the embodiments of the disclosure. The user terminal may also sometimes be referred to as a terminal, an access terminal, a UE unit, a UE station, a mobile station, a remote station, a remote terminal, a mobile device, a UE terminal, a wireless communication device, a UE proxy, a UE apparatus, or the like, which is not limited in the embodiments of the disclosure.

Figure 1:
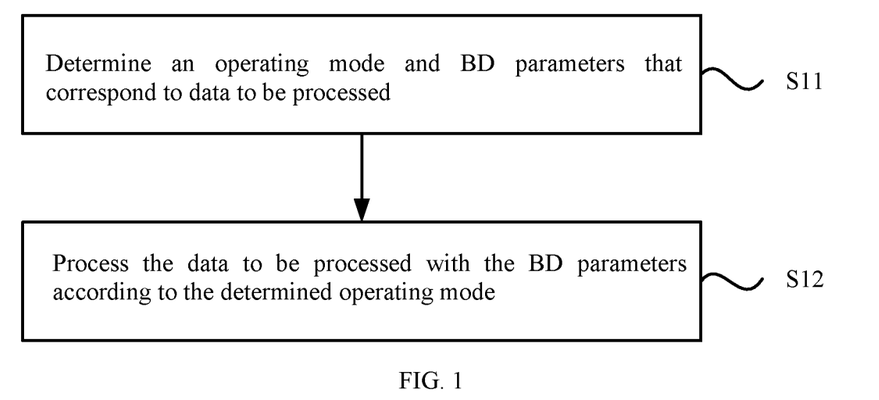
FIG. 1 is a flowchart of a data processing method provided by an embodiment of the disclosure.

According to an embodiment of the disclosure, provided is a data processing method. As shown in FIG. 1, an RSRP data processing method provided in this embodiment mainly includes steps S11 and S12.

At S11, an operating mode and buffer description (BD) parameters that correspond to data to be processed is determined.

At S12, the data to be processed is processed with the BD parameters according to the determined operating mode.

The buffer description (buffer descriptor) is used to cache a task queue.

The data processing method provided in this embodiment includes: determining an operating mode and BD parameters that correspond to data to be processed, and processing the data to be processed with the BD parameters according to the determined operating mode. By using different operating modes and BD parameters to process data in different processing procedures, the system performance may be improved and the system processing delay and processing power consumption may be reduced under the condition of limited bandwidth resources.

In an exemplary implementation, the operating modes include one or more of an uplink operating mode, a downlink operating mode, an inverse fast Fourier transform (IFFT) mode, a fast Fourier transform (Fast Fourier Transform, FFT) mode, and a BYPASS mode.

In an exemplary implementation, if the operating mode is the uplink operating mode, the processing the data to be processed with the BD parameters according to the determined operating mode includes: performing a first pre-processing on the data to be processed based on a time domain decompression identifier, an uplink windowing identifier, a cyclic prefix (CP) removal identifier and a frequency offset compensation identifier of the BD parameters; performing FFT transformation on the data subjected to the first pre-processing, to obtain frequency domain data; and performing a first post-processing on the frequency domain data based on a time offset compensation identifier, a gain identifier, an all-point outputting identifier, a first weighting identifier and a frequency domain compression identifier of the BD parameters.

In an exemplary implementation, the performing the first pre-processing on the data to be processed based on the time domain decompression identifier, the uplink windowing identifier, the CP removal identifier and the frequency offset compensation identifier of the BD parameters includes: performing time domain decompression in response to the time domain decompression identifier being in a first state; performing uplink windowing in response to the uplink windowing identifier being in a second state; performing CP removal in response to the CP removal identifier being in a third state; and performing frequency offset compensation in response to the frequency offset compensation identifier being in a fourth state.

The first state, the second state, the third state, and the fourth state may be the same or different, which is not limited in this embodiment. The first state, the second state, the third state, and the fourth state may be enabled states.

That is, in response to the time domain decompression identifier being in an enabled state, the time domain decompression is performed; in response to the uplink windowing identifier being in an enabled state, the uplink windowing is performed; in response to the CP removal identifier being in an enabled state, the CP removal is performed; and in response to the frequency offset compensation identifier being in an enabled state, the frequency offset compensation is performed.

In some instances, in response to the time domain decompression identifier being not in the enabled state, the time domain decompression is not performed and whether the uplink windowing identifier is in the enabled state is directly determined. In response to the uplink windowing identifier being not in the enabled state, the uplink windowing is not performed and whether the CP removal identifier is in the enabled state is directly determined. In response to the CP removal identifier being not in the enabled state, the CP removal is not performed and whether the frequency offset compensation identifier is in the enabled state is directly determined. In response to the frequency offset compensation identifier being not in the enabled state, the frequency offset compensation is not performed and the process directly proceeds to FFT transformation.

In an exemplary implementation, the performing the first post-processing on the frequency domain data based on the time offset compensation identifier, the gain identifier, the all-point outputting identifier, the first weighting identifier and the frequency domain compression identifier of the BD parameters includes: performing time offset compensation in response to the time offset compensation identifier being in a fifth state; performing automatic gaining in response to the gain identifier being in a sixth state; performing all-point outputting in response to the all-point outputting identifier being in a seventh state; performing weighting in response to the first weighting identifier being in an eighth state; and performing frequency domain compression in response to the frequency domain compression identifier being in a ninth state.

The fifth state, the sixth state, the seventh state, the eighth state, and the ninth state may be the same or different, which is not limited in this embodiment. The fifth state, the sixth state, the seventh state, the eighth state and the ninth state may be enabled states.

In some instances, in response to the time offset compensation identifier being not in the enabled state, the time offset compensation is not performed and whether the gain identifier is in the enabled state is directly determined. In response to the gain identifier being not in the enabled state, the automatic gaining is not performed and whether the all-point outputting identifier is in the enabled state is directly determined. In response to the all-point outputting identifier being not in the enabled state, the all-point outputting is not performed and it is directly determined whether the first weighting identifier is in the enabled state. In response to the first weighting identifier being not in the enabled state, the weighting is not performed and whether the frequency domain compression identifier is in the enabled state is directly determined. In response to the frequency domain compression identifier being not in the enabled state, the frequency domain compression is not performed, and the process directly proceeds to data sorting and then task reporting.

That is, in response to the time offset compensation identifier being in the enabled state, the time offset compensation is performed; in response to the gain identifier being in the enabled state, the automatic gaining is performed; in response to the all-point outputting identifier being in the enabled state, the all-point outputting is performed; in response to the first weighting identifier being in the enabled state, the weighting is performed; and in response to the frequency domain compression identifier being in the enabled state, the frequency domain compression is performed.

In an exemplary implementation, in response to the operating mode being the downlink operating mode, the processing the data to be processed with the BD parameters according to the determined operating mode includes: performing a second pre-processing on the data to be processed based on a frequency domain decompression identifier and a second weighting identifier of the BD parameters; performing IFFT transformation on the data subjected to the second pre-processing, to obtain time domain data; and performing a second post-processing on the time domain data based on a power compensation identifier, a frequency offset loading identifier, a CP adding identifier, a downlink windowing identifier and a time domain compression identifier of the BD parameters.

In an exemplary implementation, the performing the second pre-processing on the data to be processed based on the frequency domain decompression identifier and the second weighting identifier of the BD parameters includes: performing frequency domain decompression in response to the frequency domain decompression identifier being in a tenth state; and performing weighting in response to the second weighting identifier being in an eleventh state.

The tenth state and the eleventh state may be the same or different, which is not limited in this embodiment. The tenth state and the eleventh state may be enabled states.

That is, in response to the frequency domain decompression identifier being in the enabled state, the frequency domain decompression is performed; and in response to the second weighting identifier being in the enabled state, the weighting is performed.

In response to the frequency domain decompression identifier being not in the enabled state, the frequency domain decompression is not performed and whether the second weighting identifier is in the enabled state is directly determined; and in response to the second weighting identifier being not in the enabled state Next, the weighting is not performed and the process proceeds to IFFT processing.

In an exemplary implementation, the performing the second post-processing on the time domain data based on the power compensation identifier, the frequency offset loading identifier, the CP adding identifier, the downlink windowing identifier and the time domain compression identifier of the BD parameters includes: performing power compensation in response to the power compensation indicator being in a twelfth state; performing frequency offset loading in response to the frequency offset loading indicator being in a thirteenth state; performing CP adding in response to the CP adding identifier being in a fourteenth state; performing downlink windowing in response to the downlink windowing identifier being in a fifteenth state; and performing time domain compression in response to the time domain compression identifier being in a sixteenth state.

The twelfth state, the thirteenth state, the fourteenth state, the fifteenth state, and the sixteenth state may be the same or different, which is not limited in this embodiment. The twelfth state, the thirteenth state, the fourteenth state, the fifteenth state and the sixteenth state may be enabled states.

That is, in response to the power compensation identifier being in the enabled state, the power compensation is performed; in response to the frequency offset loading identifier being in the enabled state, the frequency offset loading is performed; in response to the CP adding identifier being in the enabled state, the CP adding is performed; in response to the downlink windowing identifier being in the enabled state, the downlink windowing is performed; and in response to the enabled state being the sixteenth state, the time domain compression is performed.

In some instances, in response to the power compensation identifier being not in the enabled state, the power compensation is not performed and whether the frequency offset loading identifier is in the enabled state is directly determined. In response to the frequency offset loading identifier being not in the enabled state, the frequency offset loading is not performed and whether the CP adding identifier is in the enabled state is directly determined. In response to the CP adding identifier being not in the enabled state, the CP adding is not performed and whether the downlink windowing identifier is in the enabled state is directly determined. In response to the downlink windowing identifier being not in the enabled state, the downlink windowing is not performed and whether the time domain compression identifier is in the enabled state is directly determined. In response to the time domain compression identifier being not in the enabled state, the time domain compression is not performed, and the process directly proceeds to data sorting and then task reporting.

In an exemplary implementation, in response to the operating mode being the FFT mode, the processing the data to be processed with the BD parameters according to the determined operating mode includes: performing FFT transformation on the data to be processed.

In an exemplary implementation, in response to the operating mode being the IFFT mode, the processing the data to be processed with the BD parameters according to the determined operating mode includes: performing IFFT transformation on the data to be processed.

In an exemplary implementation, in response to the operating mode being the BYPASS mode, the processing the data to be processed with the BD parameters according to the determined operating mode includes: performing BYPASS processing on the data to be processed.

In an embodiment, with regard to the characteristics and application scenarios of existing OFDM systems, a processing method which may improve the performance and flexibly process OFDM time-frequency domain symbol data is proposed to enhance the configuration flexibility of OFDM time-frequency domain symbol processing, reduce the overall processing delay of OFDM-related operation, improve the system performance, improve the system transmission efficiency and processing speed, and reduce the system power consumption.

The optimized OFDM system time-frequency domain symbol processing mainly includes the following functions: time offset compensation, frequency offset compensation, uplink windowing, downlink windowing, CP adding, CP removal, time domain compression and decompression, frequency domain compression and decompression, data automatic gain control, data weighting control, IFFT transformation, FFT transformation, data pass-through processing, etc.

Figure 2:
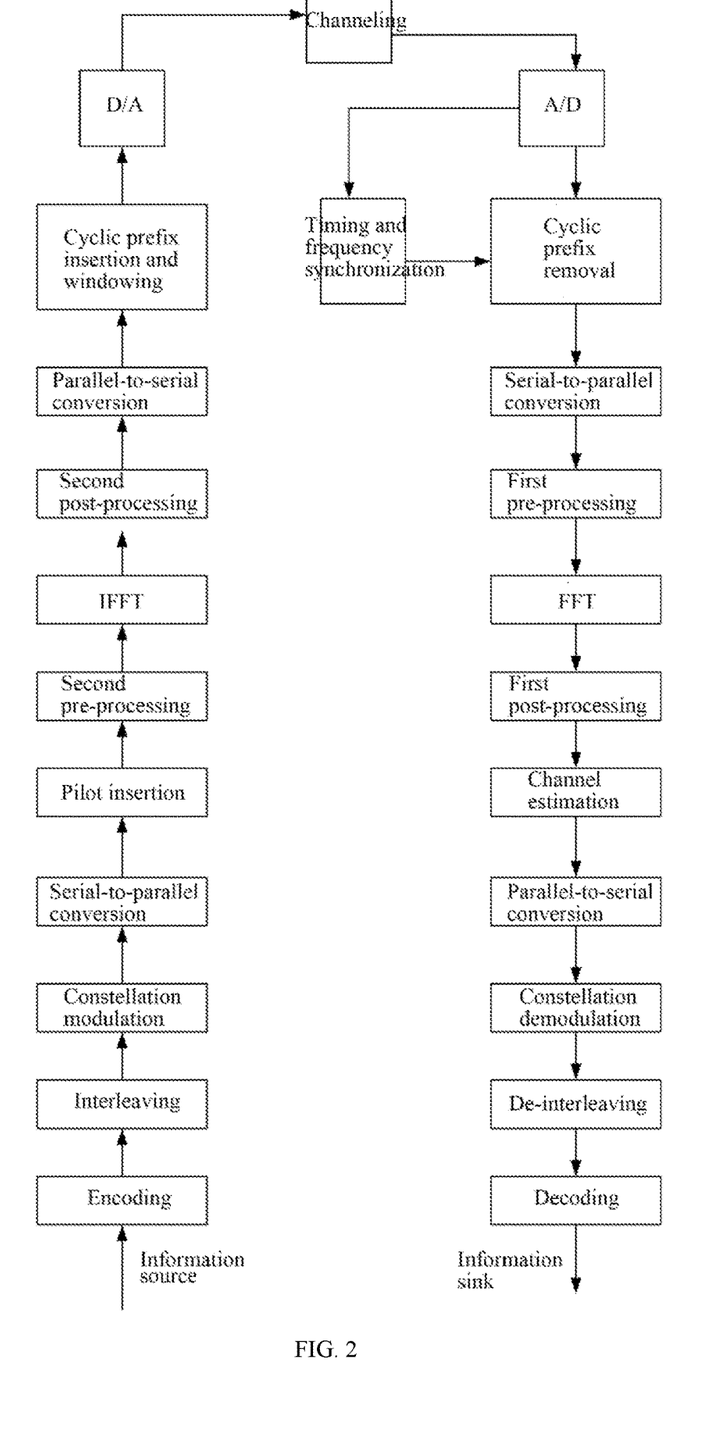
FIG. 2 is a flowchart of an OFDM processing method provided by an embodiment of the disclosure.

In an embodiment, the optimized OFDM processing is as shown in FIG. 2, in which an information source is sequentially subjected to encoding, interleaving, constellation modulation, serial-to-parallel conversion, pilot insertion, second pre-processing, IFFT, second post-processing, parallel-to-serial conversion, cyclic prefix insertion and windowing, D/A, channeling, A/D, timing and frequency synchronization, cyclic prefix removal, serial-to-parallel conversion, first pre-processing, FFT, first post-processing, channel estimation, parallel-to-serial conversion, constellation demodulation, de-interleaving, decoding, etc., to obtain an information sink.

By adding pre-processing and post-processing procedures such as data adjustment weighting, frequency offset, data compression and decompression, and windowing, the system performance is improved, and the system processing delay and processing power consumption are reduced under the condition of more-limited resources.

Figure 3:
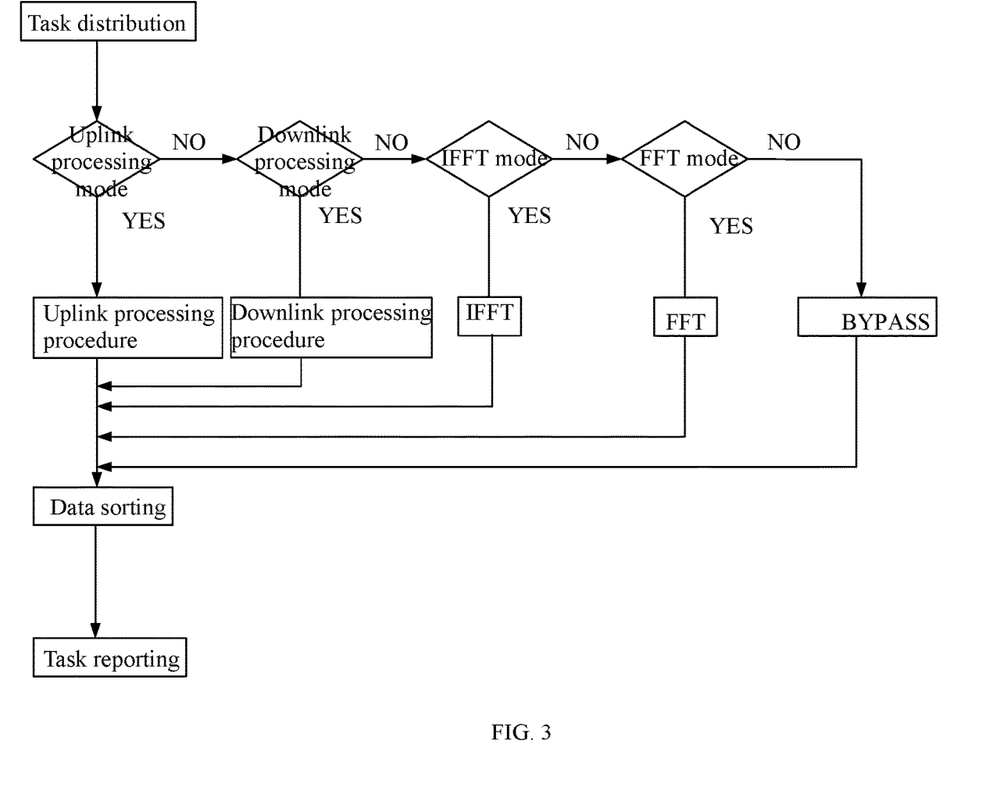
FIG. 3 is a flowchart of a data processing method provided by an embodiment of the disclosure.

In an embodiment, a data processing method includes the following processing steps, as shown in FIG. 3.

Task distribution: An external main control module transmits an operating mode and BD parameters to an OFDM processing system. In some instances, a task distribution module performs switch configuration and corresponding task reading through a register and the BD parameters.

Operating mode determination: five operating modes present in total, namely an uplink processing mode, a downlink processing mode, an IFFT mode, an FFT mode, and a BYPASS mode. In the case of the uplink processing mode, jump to processing in an uplink task mode; in the case of the downlink processing mode, jump to processing in a downlink task mode; in the case of the IFFT mode, jump to processing in the IFFT mode; in the case of the FFT mode, jump to processing in the FFT mode; and in the case of the BYPASS mode, directly output data through BYPASS.

Figure 4:
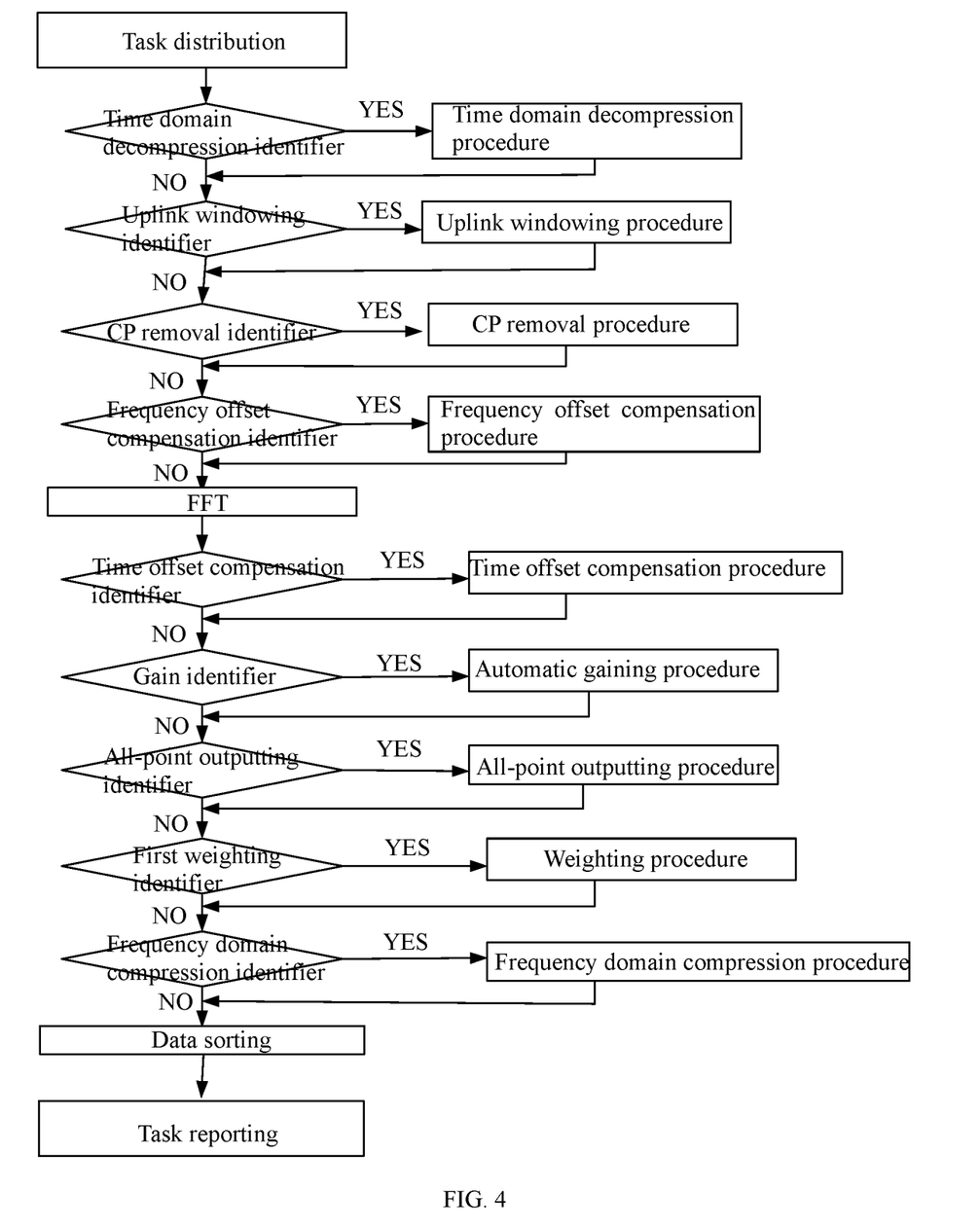
FIG. 4 is a flowchart in an uplink processing mode provided by an embodiment of the disclosure.

In an embodiment, a method for an uplink processing mode is provided, and steps S101 to S115 are as shown in FIG. 4.

At S101, a task is distributed.

At S102, whether to perform a time domain decompression operation is determined according to a time domain decompression identifier in BD parameters, and if yes, the method proceeds to time domain decompression, otherwise, the process proceeds to S103.

At S103, whether to perform an uplink windowing operation is determined according to an uplink windowing identifier, and if yes, the method proceeds to uplink windowing, otherwise, the process proceeds to S104.

At S104, whether to perform a CP removal operation is determined according to a CP removal identifier, and if yes, the method proceeds to CP removal, otherwise, the process proceeds to S105.

At S106, whether to perform a frequency offset compensation operation is determined according to a frequency offset compensation identifier, and if yes, the method proceeds to frequency offset compensation, otherwise, the process proceeds to S107.

At S108, the method proceeds to FFT processing. After the calculation is completed, data is output, and the method proceeds to S109.

At S109, whether to perform a time offset compensation operation is determined according to a time offset compensation identifier, and if yes, the method proceeds to time offset compensation, otherwise, the process proceeds to S110.

At S110, whether to perform an automatic gaining operation is determined according to a gain identifier, and if yes, the method proceeds to automatic gaining, otherwise, the process proceeds to S111.

At S111, whether to perform an all-point outputting operation is determined according to an all-point outputting identifier, and if yes, the method proceeds to all-point outputting, otherwise, the process proceeds to S112.

At S112, whether to perform a weighting operation is determined according to a first weighting identifier, and if yes, the method proceeds to weighting, otherwise, the process proceeds to S113.

At S113, whether to perform frequency domain compression operation is determined according to a frequency domain compression identifier, and if yes, the method proceeds to frequency domain compression, otherwise, the process proceeds to S114.

At S114, data is sorted, and after the processing is completed, the method proceeds to S115. At S115, the processing of a current symbol data task is completed, and an interrupt for the task completion is reported.

Figure 5:
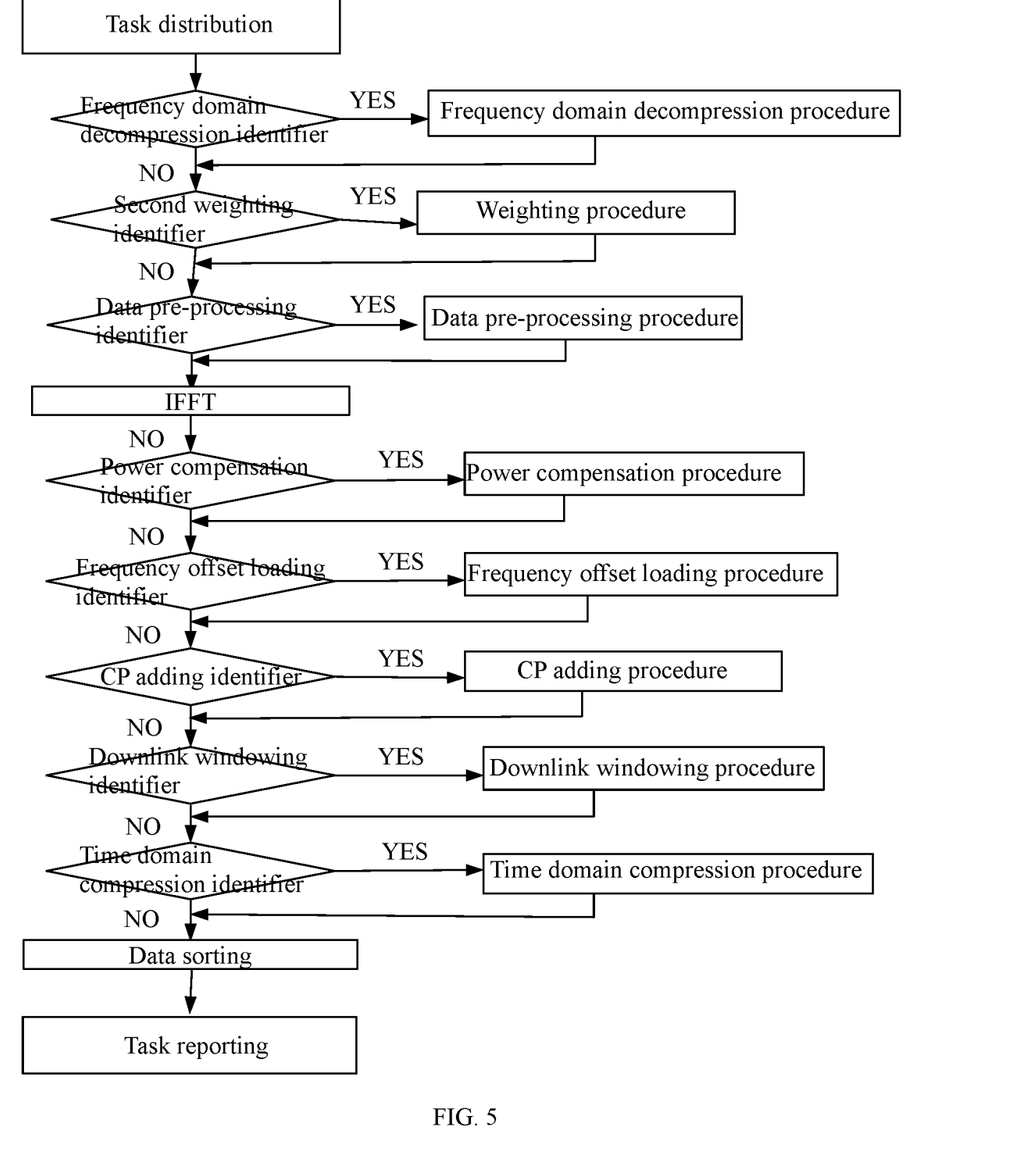
FIG. 5 is a flowchart in a downlink processing mode provided by an embodiment of the disclosure.

In an embodiment, a method for a downlink processing mode is provided, and steps S201 to S212 are as shown in FIG. 5.

At S201, a task is distributed.

At S202, whether to perform a frequency domain decompression operation is determined according to a frequency domain decompression identifier, and if yes, the method proceeds to frequency domain decompression, otherwise, the process proceeds to S203.

At S203, whether to perform a weighting operation is determined according to a second weighting identifier, and if yes, the method proceeds to weighting, otherwise, the process proceeds to S204.

At S204, whether to perform a data pre-processing operation is determined according to a data pre-processing identifier, and if yes, the method proceeds to data pre-processing, otherwise, the process proceeds to S205.

At S205, the method proceeds to IFFT processing. After the calculation is completed, data is output, and the method proceeds to S206.

At S206, whether to perform a power compensation operation is determined according to a power compensation identifier, and if yes, the method proceeds to power compensation, otherwise, the process proceeds to S207.

At S207, whether to perform a frequency offset loading operation is determined according to a frequency offset loading identifier, and if yes, the method proceeds to frequency offset loading, otherwise, the process proceeds to S208.

At S208, whether to perform a CP adding operation is determined according to a CP adding identifier, and if yes, the method proceeds to CP adding, otherwise, the process proceeds to S209.

At S209, whether to perform a downlink windowing operation is determined according to a downlink windowing identifier, and if yes, the method proceeds to downlink windowing, otherwise, the process proceeds to S210.

At S210, whether to perform a time domain compression operation is determined according to a time domain compression identifier, and if yes, the method proceeds to time domain compression, otherwise, the process proceeds to S211.

At S211, data is sorted, and after the processing is completed, the method proceeds to S212.

At S212, the processing of a current symbol data task is completed, and an interrupt for the task completion is reported.

Figure 6:
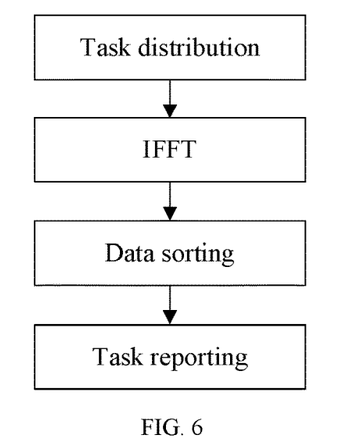
FIG. 6 is a flowchart in an IFFT processing mode provided by an embodiment of the disclosure.

In an embodiment, a method for an IFFT mode is provided, and specific steps 301 to 304 are as shown in FIG. 6.

At S301, a task is distributed.

At S302, data is directly subjected to IFFT processing, and after the processing is completed, the method proceeds to S303.

At S303, data is sorted, and after the processing is completed, the method proceeds to S304.

At S304, the processing of a current symbol data task is completed, and an interrupt for the task completion is reported.

Figure 7:
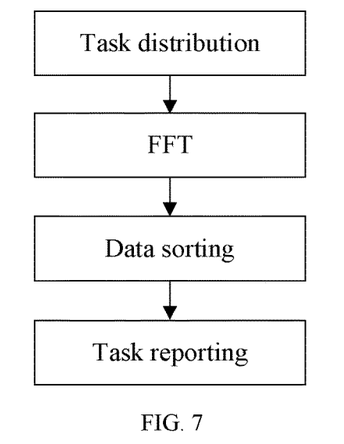
FIG. 7 is a flowchart in an FFT processing mode provided by an embodiment of the disclosure.

In an embodiment, a method for an FFT mode is provided, and specific steps 401 to 404 are as shown in FIG. 7.

At S401, a task is distributed.

At S402, data is directly subjected to FFT processing, and after the processing is completed, the method proceeds to S403.

At S403, data is sorted, and after the processing is completed, the method proceeds to S404.

At S404, the processing of a current symbol data task is completed, and an interrupt for the task completion is reported.

Figure 8:
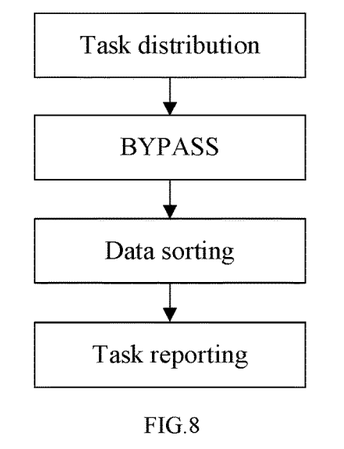
FIG. 8 is a flowchart in a BYPASS processing mode provided by an embodiment of the disclosure.

In an embodiment, a method for a BYPASS mode is provided, and specific steps 501 to 504 are as shown in FIG. 8.

At S501, a task is distributed.

At S502, data is directly subjected to BYPASS processing, and after the processing is completed, the method proceeds to S503.

At S503, data is sorted, and after the processing is completed, the method proceeds to S504.

At S504, the processing of a current symbol data task is completed, and an interrupt for the task completion is reported.

Figure 9:
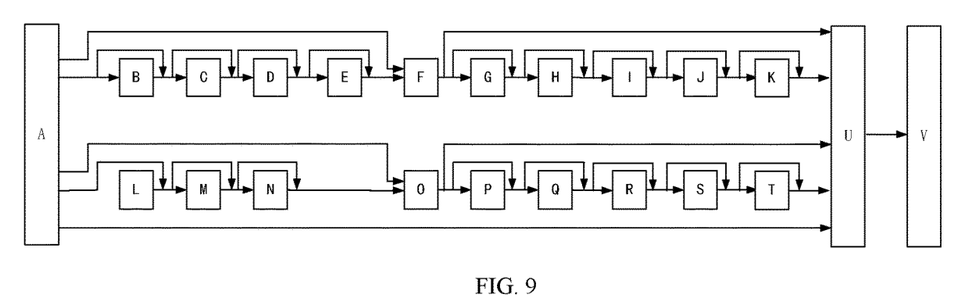
FIG. 9 is a diagram of an apparatus for implementation of data processing of a wireless communication system provided by an embodiment of the disclosure.

The disclosure provides an apparatus for implementation of data processing of a wireless communication system, as shown in FIG. 9, which mainly includes modules A to W.

A: a task configuration module. The task configuration module is configured to configure a task, i.e., configure a register and configure BD parameters. The register is configured to register an operating mode.

B: a time domain decompression module. The time domain decompression module is configured to perform time domain decompression, and this function is enabled through a parameter. The decompression includes A-law decompression and bit-width linear decompression, and the operation is performed in RB units. A-law decompression is to restore the nonlinear part of data according to the segment number. Bit-width linear decompression is to perform bit-complement processing by using the difference between the effective bit-width of data and the target compressed bit-width, thereby completing decompression.

C: a windowing module. The windowing module is configured to perform windowing, and this function is enabled through a parameter. Windowing is performed on a data receiving side, and a software issues windowing parameter data, which may flexibly realize the required function. Since windowing parameters are symmetrical, only half of the windowing parameters are stored in the storage space. The system may flexibly select windowing parameters to meet different windowing requirements.

D: a CP removal module. The CP removal module is configured to remove CP data and retain valid data.

E: a frequency offset compensation module. The frequency offset compensation module is configured to perform frequency offset compensation, supporting uplink frequency offset compensation and spectrum shifting. This function may be enabled or bypassed through a parameter. When this function is enabled, the switching of half sub-carrier bandwidth frequency offset compensation may be performed through a parameter.

F: an FFT module. The FFT module is configured to perform FFT calculation, which supports 128-point, 256-point, 384-point, 512-point, 640-point, 768-point, 1024-point, 1280-point, 1536-point, 2048-point, 2560-point, 3072-point, 3584-point, and 4096-point FFT transformation. By adopting a mixed radix algorithm of DIF radix-2, radix-3, radix-4, radix-5, radix-7, radix-6, and radix-8, the butterfly operation is divided into multiple stages for iterative calculation in the entire FFT operation. An operation result of a previous stage is used as an input to a later stage until the butterfly operation of the last stage is completed.

G: a time offset compensation module G. The time offset compensation module is configured to perform time offset compensation on data, and adjust the time offset to a certain target range, which supports time offset compensation from 0 to 2048 Ts, with a step of 8 Ts.

H: an automatic gaining module. A gain factor is an 8-bit unsigned number, which indicates the power adjustment amplitude of an intermediate frequency module to time domain data. A larger gain factor indicates a greater increase of output data power of an intermediate frequency than that of input data power thereof.

I: an all-point outputting module. The uplink output data amount is the number of uplink valid points or the number of all FFT points, which may be selected through a parameter. The number of valid points for a symbol is configured through a task parameter pack.

J: an uplink weighting module. The uplink weighting module is configured to perform weighting on FFT output frequency domain data.

K: a frequency domain compression module. The compression includes A-law compression and bit-width linear compression, and the operation is performed in RB units. A-law compression is to firstly determine the segment number according to the data size, and finally output the value of the segment number. Bit-width linear decompression is to perform bit-truncation processing according to a compression factor parameter and by using the difference between the effective bit-width of data and the target compressed bit-width, thereby realizing data compression.

L: a frequency domain decompression module. The decompression includes A-law decompression and bit-width linear decompression, and the operation is performed in RB units. A-law decompression is to firstly restore the nonlinear part of data according to the segment number, and then perform linear data decompression according to a compression factor. Bit-width linear decompression is to perform bit-complement processing according to a compression factor parameter and by using the difference between the effective bit-width of data and the target compressed bit-width.

M: a downlink weighting module. The downlink weighting module is configured to perform weighting on FFT input frequency domain data.

N: a data pre-processing module. The data pre-processing module is configured to detect the significant bit of the two's complement of the number with the largest absolute value in the entire IFFT input data. If the first bit after the decimal point is an invalid bit (i.e., the numerical value of the data is relatively small), all bits of the data are shifted by 1 bit to the left, and a shift factor is input and recorded as −1. If the first bit after the decimal point is a valid bit, all bits of the data are not shifted, and the shift factor is recorded as 0. If the bits are shifted to the left, a zero is added at the lowest bit of the data.

O: an IFFT processing module. This module is configured to determine whether to perform data pre-processing according to a register configuration value, which supports 128-point, 256-point, 384-point, 512-point, 640-point, 768-point, 1024-point, 1280-point, 1536-point, 2048-point, 2560-point, 3072-point, 3584-point, and 4096-point FFT transformation, and adopts a mixed radix algorithm of DIF radix-2, radix-3, radix-4, radix-5, radix-7, radix-6, and radix-8. The butterfly operation is divided into multiple stages for iterative calculation in the entire IFFT operation. An operation result of a previous stage is used as an input to a later stage until the butterfly operation of the last stage is completed.

P: a power compensation module. The power compensation module is configured to enable the function through a parameter, and use a configured scale factor for fixed-point processing.

Q: a frequency offset loading module. The frequency offset loading module is configured to enable frequency offset compensation and spectrum shifting functions of an NB-IOT mode through a parameter. The functions include half sub-carrier bandwidth frequency offset compensation and spectrum shifting for any bandwidth.

R: a CP adding module. The CP adding module is configured to enable the function through a parameter. Downlink data is output with a cyclic prefix according to the parameter.

S: a windowing module. The windowing module is configured to enable the function through a parameter. This processing function is added to downlink data when transmitted, and three windowing methods exist in total.

T: a time domain compression module. The compression includes A-law compression and bit-width linear compression, and the operation is performed in RB units. A-law compression is to firstly determine the segment number according to the data size, and finally output the value of the segment number. Bit-width linear decompression is to perform bit-complement processing by using the difference between the effective bit-width of data and the target compressed bit-width.

U: a BYPASS processing module.

V: a module for data sorting, processing and transmission.

W: a task reporting module. After a task is completed, an interrupt is transmitted, according to a configuration, to a software for subsequent processing.

The technical scheme in this embodiment greatly reduces data reading/writing and the processing time of OFDM data, saves the read/write bandwidth of an external memory, also reduces the interaction time between software and hardware, saves the power consumption and area, and improves the economy benefit.

With regard to the apparatus in FIG. 9, the technical scheme is further described in detail in this embodiment.

When the operating mode is the uplink processing mode, the method mainly includes the following steps S1 to S13.

At S1, module A is configured to configure a task, i.e., configure a current symbol related data and BD parameters.

At S2, module B is configured to determine whether to perform a time domain decompression operation according to a time domain decompression identifier of the BD parameters, and if yes, the method proceeds to time domain decompression, otherwise, the process proceeds to the next step.

At S3, module C is configured to determine whether to perform a windowing operation according to an uplink windowing identifier, and if yes, the method proceeds to windowing, otherwise, the process proceeds to the next step.

At S4, module D is configured to determine whether to perform a CP removal operation according to a CP removal identifier, and if yes, the method proceeds to CP removal, otherwise, the process proceeds to the next step.

At S5, module E is configured to determine whether to perform a frequency offset compensation operation according to a frequency offset compensation identifier, and if yes, the method proceeds to frequency offset compensation, otherwise, the process proceeds to the next step.

At S6, module F is configured to perform FFT processing. After the calculation is completed, data is output, and the method proceeds to the next processing.

At S7, module G is configured to determine whether to perform a time offset compensation operation according to a time offset compensation identifier, and if yes, the method proceeds to time offset compensation, otherwise, the process proceeds to the next step.

At S8, module H is configured to determine whether to perform an automatic gaining operation according to a gain identifier, and if yes, the method proceeds to automatic gaining, otherwise, the process proceeds to the next step.

At S9, module I is configured to determine whether to perform an all-point outputting operation according to an all-point outputting identifier, and if yes, the method proceeds to all-point outputting, otherwise, the process proceeds to the next step.

At S10, module J is configured to determine whether to perform a weighting operation according to a first weighting identifier, and if yes, the method proceeds to weighting, otherwise, the process proceeds to the next step.

At S11, module K is configured to determine whether to perform frequency domain compression operation according to a frequency domain compression identifier, and if yes, the method proceeds to compression, otherwise, the process proceeds to the next step.

At S12, module V is configured to perform data sorting, and after the processing is completed, the method proceeds to the next step.

At S13, module W is a current symbol data task completion and processing module, which reports an interrupt for the task completion.

When the operating mode is the downlink processing mode, the method mainly includes the following steps S1 to S12.

At S1, module A is configured to configure a task, i.e., configure a current symbol related data and BD parameters.

At S2, module L is configured to determine whether to perform a frequency domain decompression operation according to a frequency domain decompression identifier, and if yes, the method proceeds to frequency domain decompression, otherwise, the process proceeds to the next step.

At S3, module M is configured to determine whether to perform a weighting operation according to a second weighting identifier, and if yes, the method proceeds to weighting, otherwise, the process proceeds to the next step.

At S4, module N is configured to determine whether to perform a data pre-processing operation according to a data pre-processing identifier, and if yes, the method proceeds to data pre-processing, otherwise, the process proceeds the next step.

At S5, module O is configured to perform IFFT processing. After the calculation is completed, data is output, and the method proceeds to the next processing.

At S6, module P is configured to determine whether to perform a power compensation operation according to a power compensation identifier, and if yes, the method proceeds to power compensation, otherwise, the process proceeds the next step.

At S7, module Q is configured to determine whether to perform a frequency offset loading operation according to a frequency offset loading identifier, and if yes, the method proceeds to frequency offset loading, otherwise, the process proceeds to the next step.

At S8, module R is configured to determine whether to perform a CP adding operation according to a CP adding identifier, and if yes, the method proceeds to CP adding, otherwise, the process proceeds to the next step.

At S9, module S is configured to determine whether to perform a windowing operation according to a downlink windowing identifier, and if yes, the method proceeds to windowing, otherwise, the process proceeds to the next step.

At S10, module T is configured to determine whether to perform time domain compression operation according to a time domain compression identifier, and if yes, the method proceeds to time domain compression, otherwise, the process proceeds to the next step.

At S11, module V is configured to perform data sorting, and after the processing is completed, the method proceeds to the next step.

At S12, module W is a current symbol data task completion and processing module, which reports an interrupt for the task completion.

When the operating mode is the IFFT processing mode, the method mainly includes the following steps S1 to S4.

At S1, module A is configured to configure a task, i.e., configure a current symbol related data and BD parameters.

At S2, data goes to the IFFT processing module O, and after the processing, the method proceeds to the next step.

At S3, module V is configured to perform data sorting, and after the processing is completed, the method proceeds to the next step.

At S4, module W is a current symbol data task completion and processing module, which reports an interrupt for the task completion.

When the operating mode is the FFT processing mode, the method mainly includes the following steps 1 to 4.

At S1, module A is configured to configure a task, i.e., configure a current symbol related data and a parameter.

At S2, data goes to the FFT processing module F, and after the processing, the method proceeds to the next step.

At S3, module V is configured to perform data sorting, and after the processing is completed, the method proceeds to the next step.

At S4, module W is a current symbol data task completion and processing module, which reports an interrupt for the task completion.

When the operating mode is the BYPASS mode, the method mainly includes the following steps S1 to S4.

At S1, module A is configured to configure a task, i.e., configure a current symbol related data and a parameter.

At S2, data goes to the BYPASS processing module U, and after the processing, the method proceeds to the next step.

At S3, module V is configured to perform data sorting, and after the processing is completed, the method proceeds to the next step.

At S4, module W is a current symbol data task completion and processing module, which reports an interrupt for the task completion.

Figure 10:
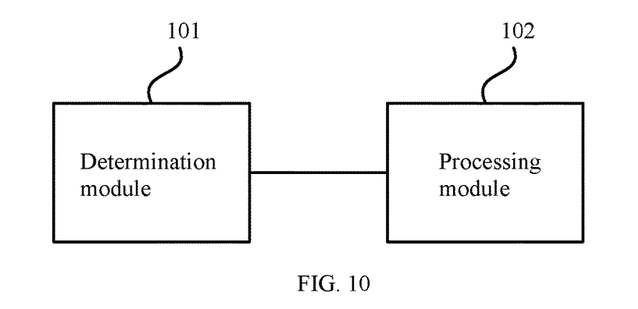
FIG. 10 is a schematic structural diagram of a data processing apparatus provided by an embodiment of the disclosure.
Figure 11:
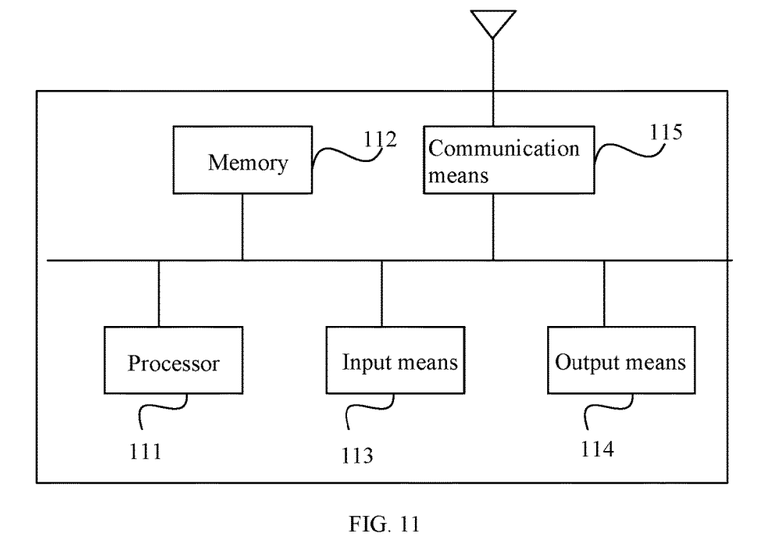
FIG. 11 is a schematic structural diagram of a device provided by an embodiment of the disclosure.

According to an embodiment of the disclosure, provided is a data processing apparatus, as shown in FIG. 10. The data processing apparatus provided in this embodiment mainly includes a determination module 101 and a processing module 102.

The determination module 101 is configured to determine an operating mode and BD parameters that correspond to data to be processed.

The processing module 102 is configured to process the data to be processed with the BD parameters according to the determined operating mode.

In an exemplary implementation, the operating mode includes one or more of an uplink operating mode, a downlink operating mode, an inverse fast Fourier transform IFFT mode, a fast Fourier transform FFT mode, and a BYPASS mode.

In an exemplary implementation, the processing module 102 is configured to perform a first pre-processing on the data to be processed based on a time domain decompression identifier, an uplink windowing identifier, a CP removal identifier and a frequency offset compensation identifier of the BD parameters; perform FFT transformation on the data subjected to the first pre-processing, to obtain frequency domain data; and perform a first post-processing on the frequency domain data based on a time offset compensation identifier, a gain identifier, an all-point outputting identifier, a first weighting identifier and a frequency domain compression identifier of the BD parameters.

In an exemplary implementation, the performing the first pre-processing on the data to be processed based on the time domain decompression identifier, the uplink windowing identifier, the CP removal identifier and the frequency offset compensation identifier of the BD parameters includes: performing time domain decompression in response to the time domain decompression identifier being in a first state; performing uplink windowing in response to the uplink windowing identifier being in a second state; performing CP removal in response to the CP removal identifier being in a third state; and performing frequency offset compensation in response to the frequency offset compensation identifier being in a fourth state.

In an exemplary implementation, the performing the first post-processing on the frequency domain data based on the time offset compensation identifier, the gain identifier, the all-point outputting identifier, the first weighting identifier and the frequency domain compression identifier of the BD parameters includes: performing time offset compensation in response to the time offset compensation identifier being in a fifth state; performing automatic gaining in response to the gain identifier being in a sixth state; performing all-point outputting in response to the all-point outputting identifier being in a seventh state; performing weighting in response to the first weighting identifier being in an eighth state; and performing frequency domain compression in response to the frequency domain compression identifier being in a ninth state.

In an exemplary implementation, the processing module 102 is configured to perform a second pre-processing on the data to be processed based on a frequency domain decompression identifier and a second weighting identifier of the BD parameters; perform IFFT transformation on the data subjected to the second pre-processing, to obtain time domain data; and perform a second post-processing on the time domain data based on a power compensation identifier, a frequency offset loading identifier, a CP adding identifier, a downlink windowing identifier and a time domain compression identifier of the BD parameters.

In an exemplary implementation, the performing the second pre-processing on the data to be processed based on the frequency domain decompression identifier and the second weighting identifier of the BD parameters includes: performing frequency domain decompression in response to the frequency domain decompression identifier being in a tenth state; and performing weighting in response to the second weighting identifier being in an eleventh.

In an exemplary implementation, the performing the second post-processing on the time domain data based on the power compensation identifier, the frequency offset loading identifier, the CP adding identifier, the downlink windowing identifier and the time domain compression identifier of the BD parameters includes: performing power compensation in response to the power compensation indicator being in a twelfth state; performing frequency offset loading in response to the frequency offset loading indicator being in a thirteenth state; performing CP adding in response to the CP adding identifier being in a fourteenth state; performing downlink windowing in response to the downlink windowing identifier being in a fifteenth state; and performing time domain compression in response to the time domain compression identifier being in a sixteenth state.

In an exemplary implementation, the processing module 102 is configured to perform FFT transformation on the data to be processed.

In an exemplary implementation, the processing module 102 is configured to perform IFFT transformation on the data to be processed.

In an exemplary implementation, the processing module 102 is configured to perform BYPASS processing on the data to be processed.

The data processing apparatus provided in this embodiment includes: determining an operating mode and BD parameters that correspond to data to be processed, and processing the data to be processed with the BD parameters according to the determined operating mode. By using different operating modes and BD parameters to process data in different processing procedures, the system performance may be improved and the system processing delay and processing power consumption may be reduced under the condition of limited bandwidth resources.

The data processing apparatus provided in this embodiment may implement the data processing method provided by any embodiment of the present invention, and has corresponding functional modules for implementing the method and beneficial effects. For technical details not described in detail in this embodiment, reference may be made to the data processing method provided by any embodiment of the present invention.

It is worthy to note that, in the embodiments of the above-mentioned data processing apparatus, the units and modules included are merely divided according to functional logic, but are not limited to the above-mentioned division, as long as the corresponding functions may be realized. In addition, the specific names of the functional units are merely for the convenience of distinguishing from each other, and are not intended to limit the protection scope of the disclosure. An embodiment of the disclosure further provides a device. FIG. 4 is a schematic structural diagram of a device provided by an embodiment of the disclosure. As shown in FIG. 4, the device includes a processor 41, a memory 42, an input means 43, an output means 44 and a communication means 45. There may be one or more processors 41 in the device, and one processor 41 is taken as an example in FIG. 4. The processor 41, the memory 42, the input means 43 and the output means 44 in the device may be connected by a bus or other means, and the bus connection is taken as an example in FIG. 4.

As a computer-readable storage medium, the memory 42 may be used to store software programs, computer-executable programs, and modules, such as program instructions/modules (e.g., the determination module 101 and the processing module 102 in the data processing apparatus) corresponding to the data processing method in the embodiments of the disclosure. The processor 41 runs the software programs, instructions, and modules stored in the memory 42, thus implementing various functional applications and data processing of the device, i.e., implementing any method provided in the embodiments of the disclosure.

The memory 42 may mainly include a program storage region and a data storage region. The program storage region may store an operating system, an application program required for at least one function. The data storage region may store data created with the use of the device, and the like. Additionally, the memory 42 may include a high-speed random access memory, and may also include a non-volatile memory, such as at least one magnetic disk memory device, flash memory device, or other non-volatile solid state memory device. In some instances, the memory 42 may further include a memory provided remotely from the processor 41. Such remote memories may be connected to the device over a network. Instances of the above-mentioned networks include, but are not limited to, the Internet, an intranet, a local area network, a mobile communication network, and combinations thereof.

The input means 43 may be configured to receive input numerical or character information, and to generate signal input related to user settings and function control of the device. The output means 44 may include a display device such as a display screen.

The communication means 45 may include a receiver and a transmitter. The communication means 45 is configured to perform information transceiving communication according to the control of the processor 41.

In an exemplary implementation, an embodiment of the disclosure further provides a non-transitory computer-readable storage medium containing computer-executable instructions, which, when executed by a computer processor, cause the processor to carry out a data processing method. The method includes:
  determining an operating mode and BD parameters that correspond to data to be processed; and
  processing the data to be processed with the BD parameters according to the determined operating mode.

Of course, with respect to a storage medium containing computer-executable instructions provided by the embodiment of the disclosure, the computer-executable instructions are not limited to the above-mentioned method operations, and may also implement related operations in the data processing method provided by any embodiment of the disclosure.

The embodiments provide a data processing method and apparatus, a device, and a non-transitory computer-readable storage medium. The method includes: determining an operating mode and BD parameters that correspond to data to be processed, and processing the data to be processed with the BD parameters according to the determined operating mode. By using different operating modes and BD parameters to process data in different processing procedures, the system performance may be improved and the system processing delay and processing power consumption may be reduced under the condition of limited bandwidth resources.

From the above description of the implementations, those having ordinary skills in the art may clearly understand that the disclosure may be implemented by software and necessary general-purpose hardware, and of course may also be implemented by hardware, but in many cases, the former is a better implementation. Based on such understanding, the technical scheme of the disclosure, in essence, or its contribution to the prior art may be embodied in the form of a software product. The computer software product may be stored in a computer-readable storage medium, such as a floppy disk, a read-only memory (ROM), a random access memory (RAM), a flash memory (FLASH), a hard disk or an optical disk of a computer, etc., including several instructions to make the computer device (which may be a personal computer, a server, a network device, or the like) to carry out the methods described in the embodiments of the disclosure.

The above descriptions are merely exemplary embodiments of the disclosure, and are not intended to limit the protection scope of the disclosure.

As will be understood by those having ordinary skills in the art, the term "user terminal" encompasses any suitable type of wireless user devices, such as mobile telephones, portable data processing apparatuses, portable web browsers or vehicle-mounted mobile stations.

In general, the embodiments of the disclosure may be implemented in hardware or special-purpose circuits, software, logic, or any combinations thereof. For example, some aspects may be implemented in hardware, while other aspects may be implemented in firmware or software that may be executed by a controller, microprocessor or other computing apparatus, though the disclosure is not limited thereto.

Embodiments of the disclosure may be implemented by the execution of computer program instructions by a data processor of a mobile apparatus, e.g. in a processor entity, or by hardware, or by a combination of software and hardware. Computer program instructions may be assembly instructions, instruction set architecture (ISA) instructions, machine instructions, machine-dependent instructions, microcode, firmware instructions, state setting data, or source code or object code written in any combination of one or more programming languages.

The block diagrams of any logic flow in the drawings of the disclosure may represent procedure steps, or may represent interconnected logic circuits, modules and functions, or may represent a combination of procedure steps and logic circuits, modules and functions. Computer programs may be stored in a memory. The memory may be of any type suitable for a local technical environment and may be implemented using any suitable data storage technology, such as but not limited to, a read only memory (ROM), a random access memory (RAM), an optical memory device and system (digital versatile disk DVD or CD), etc. The computer-readable medium may include a non-transitory storage medium. The data processor may be of any type suitable for a local technical environment, such as but not limited to a general-purpose computer, a special-purpose computer, a microprocessor, a digital signal processor (DSP), an application specific integrated circuit (ASIC), a programmable logic device (FGPA) and a processor based on a multi-core processor architecture.

By way of illustrative and non-limiting example, the foregoing has provided a detailed description of exemplary embodiments of the disclosure. However, when considered in conjunction with the accompanying drawings and claims, various modifications and adjustments to the above embodiments will be apparent to those having ordinary skills in the art without departing from the scope of the present invention. Accordingly, the proper scope of the present invention will be determined with reference to the appended claims.

What is claimed is:

1. A data processing method, comprising:
   determining an operating mode and buffer description BD parameters that correspond to data to be processed; and
   processing the data to be processed with the BD parameters according to the determined operating mode;
   wherein the operating mode comprises one or more of an uplink operating mode, a downlink operating mode, an inverse fast Fourier transform IFFT mode, a fast Fourier transform FFT mode, and a BYPASS mode, and in response to the operating mode being the uplink operating mode, the processing the data to be processed with the BD parameters according to the determined operating mode comprises:
   in response to the operating mode being the uplink operating mode, performing a first pre-processing on the data to be processed based on a time domain decompression identifier, an uplink windowing identifier, a CP removal identifier and a frequency offset compensation identifier of the BD parameters;
   performing FFT transformation on the data subjected to the first pre-processing, to obtain frequency domain data; and
   performing a first post-processing on the frequency domain data based on a time offset compensation identifier, a gain identifier, an all-point outputting identifier, a first weighting identifier and a frequency domain compression identifier of the BD parameters.

2. The method of claim 1, wherein the performing a first pre-processing on the data to be processed based on a time domain decompression identifier, an uplink windowing identifier, a cyclic prefix CP removal identifier and a frequency offset compensation identifier of the BD parameters comprises:
   performing time domain decompression in response to the time domain decompression identifier being in a first state;
   performing uplink windowing in response to the uplink windowing identifier being in a second state;
   performing CP removal in response to the CP removal identifier being in a third state; and
   performing frequency offset compensation in response to the frequency offset compensation identifier being in a fourth state.

3. The method of claim 1, wherein the performing a first post-processing on the frequency domain data based on a time offset compensation identifier, a gain identifier, an all-point outputting identifier, a first weighting identifier and a frequency domain compression identifier of the BD parameters comprises:
    performing time offset compensation in response to the time offset compensation identifier being in a fifth state;
    performing automatic gaining in response to the gain identifier being in a sixth state;
    performing all-point outputting in response to the all-point outputting identifier being in a seventh state;
    performing weighting in response to the first weighting identifier being in an eighth state; and
    performing frequency domain compression in response to the frequency domain compression identifier being in a ninth state.

4. The method of claim 1, wherein in response to the operating mode being the downlink operating mode, the processing the data to be processed with the BD parameters according to the determined operating mode comprises:
    performing second pre-processing on the data to be processed based on a frequency domain decompression identifier and a second weighting identifier of the BD parameters;
    performing IFFT transformation on the data subjected to the second pre-processing, to obtain time domain data; and
    performing second post-processing on the time domain data based on a power compensation identifier, a frequency offset loading identifier, a CP adding identifier, a downlink windowing identifier and a time domain compression identifier of the BD parameters.

5. The method of claim 4, wherein the performing second pre-processing on the data to be processed based on a frequency domain decompression identifier and a second weighting identifier of the BD parameters comprises:
    performing frequency domain decompression in response to the frequency domain decompression identifier being in a tenth state; and
    performing weighting in response to the second weighting indicator being in an eleventh state.

6. The method of claim 4, wherein the performing second post-processing on the time domain data based on a power compensation identifier, a frequency offset loading identifier, a CP adding identifier, a downlink windowing identifier and a time domain compression identifier of the BD parameters comprises:
    performing power compensation in response to the power compensation identifier being in a twelfth state;
    performing frequency offset loading in response to the frequency offset loading identifier being in a thirteenth state;
    perform CP adding in response to the CP adding identifier being in a fourteenth state;
    performing downlink windowing in response to the downlink windowing identifier being in a fifteenth state; and
    performing time domain compression in response to the time domain compression identifier being in a sixteenth state.

7. The method of claim 1, wherein in response to the operating mode being the FFT mode, the processing the data to be processed with the BD parameters according to the determined operating mode comprises:
    performing FFT transformation on the data to be processed.

8. The method of claim 1, wherein in response to the operating mode being the IFFT mode, the processing the data to be processed with the BD parameters according to the determined operating mode comprises:
    performing IFFT transformation on the data to be processed.

9. The method of claim 1, wherein in response to the operating mode being the BYPASS mode, the processing the data to be processed with the BD parameters according to the determined operating mode comprises:
    performing BYPASS processing on the data to be processed.

10. A device, comprising:
    one or more processors; and
    a memory configured to store one or more programs which, when executed by the one or more processors, cause the one or more processors to carry out a data processing method comprising:
        determining an operating mode and buffer description BD parameters that correspond to data to be processed; and
        processing the data to be processed with the BD parameters according to the determined operating mode;
    wherein the operating mode comprises one or more of an uplink operating mode, a downlink operating mode, an inverse fast Fourier transform IFFT mode, a fast Fourier transform FFT mode, and a BYPASS mode, and in response to the operating mode being the uplink operating mode, the processing the data to be processed with the BD parameters according to the determined operating mode comprises:
        in response to the operating mode being the uplink operating mode, performing a first pre-processing on the data to be processed based on a time domain decompression identifier, an uplink windowing identifier, a CP removal identifier and a frequency offset compensation identifier of the BD parameters;
        performing FFT transformation on the data subjected to the first pre-processing, to obtain frequency domain data; and
        performing a first post-processing on the frequency domain data based on a time offset compensation identifier, a gain identifier, an all-point outputting identifier, a first weighting identifier and a frequency domain compression identifier of the BD parameters.

11. The device of claim 10, wherein the performing a first pre-processing on the data to be processed based on a time domain decompression identifier, an uplink windowing identifier, a cyclic prefix CP removal identifier and a frequency offset compensation identifier of the BD parameters comprises:
    performing time domain decompression in response to the time domain decompression identifier being in a first state;
    performing uplink windowing in response to the uplink windowing identifier being in a second state;
    performing CP removal in response to the CP removal identifier being in a third state; and
    performing frequency offset compensation in response to the frequency offset compensation identifier being in a fourth state.

12. The device of claim 10, wherein the performing a first post-processing on the frequency domain data based on a time offset compensation identifier, a gain identifier, an all-point outputting identifier, a first weighting identifier and a frequency domain compression identifier of the BD parameters comprises:

performing time offset compensation in response to the time offset compensation identifier being in a fifth state;
performing automatic gaining in response to the gain identifier being in a sixth state;
performing all-point outputting in response to the all-point outputting identifier being in a seventh state;
performing weighting in response to the first weighting identifier being in an eighth state; and
performing frequency domain compression in response to the frequency domain compression identifier being in a ninth state.

13. The device of claim 10, wherein in response to the operating mode being the downlink operating mode, the processing the data to be processed with the BD parameters according to the determined operating mode comprises:
performing second pre-processing on the data to be processed based on a frequency domain decompression identifier and a second weighting identifier of the BD parameters;
performing IFFT transformation on the data subjected to the second pre-processing, to obtain time domain data; and
performing second post-processing on the time domain data based on a power compensation identifier, a frequency offset loading identifier, a CP adding identifier, a downlink windowing identifier and a time domain compression identifier of the BD parameters.

14. The device of claim 13, wherein the performing second pre-processing on the data to be processed based on a frequency domain decompression identifier and a second weighting identifier of the BD parameters comprises:
performing frequency domain decompression in response to the frequency domain decompression identifier being in a tenth state; and
performing weighting in response to the second weighting indicator being in an eleventh state.

15. A non-transitory computer-readable storage medium, storing computer programs which, when executed by a processor, cause the processor to carry out a data processing method comprising:
determining an operating mode and buffer description BD parameters that correspond to data to be processed; and
processing the data to be processed with the BD parameters according to the determined operating mode;
wherein the operating mode comprises one or more of an uplink operating mode, a downlink operating mode, an inverse fast Fourier transform IFFT mode, a fast Fourier transform FFT mode, and a BYPASS mode, and in response to the operating mode being the uplink operating mode, the processing the data to be processed with the BD parameters according to the determined operating mode comprises:
in response to the operating mode being the uplink operating mode, performing a first pre-processing on the data to be processed based on a time domain decompression identifier, an uplink windowing identifier, a CP removal identifier and a frequency offset compensation identifier of the BD parameters;
performing FFT transformation on the data subjected to the first pre-processing, to obtain frequency domain data; and
performing a first post-processing on the frequency domain data based on a time offset compensation identifier, a gain identifier, an all-point outputting identifier, a first weighting identifier and a frequency domain compression identifier of the BD parameters.

16. The non-transitory computer-readable storage medium of claim 15, wherein the performing a first pre-processing on the data to be processed based on a time domain decompression identifier, an uplink windowing identifier, a cyclic prefix CP removal identifier and a frequency offset compensation identifier of the BD parameters comprises:
performing time domain decompression in response to the time domain decompression identifier being in a first state;
performing uplink windowing in response to the uplink windowing identifier being in a second state;
performing CP removal in response to the CP removal identifier being in a third state; and
performing frequency offset compensation in response to the frequency offset compensation identifier being in a fourth state.

17. The non-transitory computer-readable storage medium of claim 15, wherein the performing a first post-processing on the frequency domain data based on a time offset compensation identifier, a gain identifier, an all-point outputting identifier, a first weighting identifier and a frequency domain compression identifier of the BD parameters comprises:
performing time offset compensation in response to the time offset compensation identifier being in a fifth state;
performing automatic gaining in response to the gain identifier being in a sixth state;
performing all-point outputting in response to the all-point outputting identifier being in a seventh state;
performing weighting in response to the first weighting identifier being in an eighth state; and
performing frequency domain compression in response to the frequency domain compression identifier being in a ninth state.

18. The non-transitory computer-readable storage medium of claim 15, wherein in response to the operating mode being the downlink operating mode, the processing the data to be processed with the BD parameters according to the determined operating mode comprises:
performing second pre-processing on the data to be processed based on a frequency domain decompression identifier and a second weighting identifier of the BD parameters;
performing IFFT transformation on the data subjected to the second pre-processing, to obtain time domain data; and
performing second post-processing on the time domain data based on a power compensation identifier, a frequency offset loading identifier, a CP adding identifier, a downlink windowing identifier and a time domain compression identifier of the BD parameters.

19. The non-transitory computer-readable storage medium of claim 18, wherein the performing second pre-processing on the data to be processed based on a frequency domain decompression identifier and a second weighting identifier of the BD parameters comprises:
performing frequency domain decompression in response to the frequency domain decompression identifier being in a tenth state; and
performing weighting in response to the second weighting indicator being in an eleventh state.

* * * * *